(12) United States Patent
Patryshev (10) Patent No.: US 8,667,412 B2
(45) Date of Patent: Mar. 4, 2014

(54) DYNAMIC VIRTUAL INPUT DEVICE CONFIGURATION

(75) Inventor: Vlad Patryshev, San Jose, CA (US)

(73) Assignee: Google Inc., Mountain View, CA (US)

( * ) Notice: Subject to any disclaimer, the term of this patent is extended or adjusted under 35 U.S.C. 154(b) by 1203 days.

(21) Appl. No.: 11/850,893

(22) Filed: Sep. 6, 2007

(65) Prior Publication Data

US 2009/0070098 A1 Mar. 12, 2009

(51) Int. Cl.
*G06F 17/00* (2006.01)

(52) U.S. Cl.
USPC .............. 715/773; 704/3; 704/275; 713/2; 715/264; 715/753; 715/823; 715/763; 715/780; 715/762

(58) Field of Classification Search
USPC ......... 715/773, 763, 703, 264, 753, 823, 762, 715/780; 345/168–179; 704/275
See application file for complete search history.

(56) References Cited

U.S. PATENT DOCUMENTS

| | | | | |
|---|---|---|---|---|
| 5,999,950 A * | 12/1999 | Krueger et al. | ............... | 715/263 |
| 6,271,835 B1 | 8/2001 | Hoeksma | | |
| 7,168,046 B2 * | 1/2007 | Kang et al. | .................... | 715/773 |
| 7,177,902 B2 * | 2/2007 | Hubbard | ....................... | 709/203 |
| 2004/0230912 A1 * | 11/2004 | Clow et al. | .................... | 715/773 |
| 2004/0260536 A1 | 12/2004 | Hwang | | |
| 2005/0272478 A1 | 12/2005 | Larson et al. | | |
| 2006/0256139 A1 | 11/2006 | Gikandi | | |
| 2008/0167858 A1 * | 7/2008 | Christie et al. | .................. | 704/10 |
| 2008/0174570 A1 * | 7/2008 | Jobs et al. | ..................... | 345/173 |

FOREIGN PATENT DOCUMENTS

EP 0632361 A 1/1995

OTHER PUBLICATIONS

Young, Lee W., Authorized Officer, PCT International Searching Authority, in PCT/US08/075451, International Search Report, mailed Nov. 13, 2008, 11 pages.
EPO Communication dated Oct. 3, 2013 for EP Application No. 08829415.2, 5 pages.
Supplementary European Search Report dated Sep. 5, 2013 for for EP Application No. 08829415.2, 3 pages.

* cited by examiner

*Primary Examiner* — Cesar Paula
*Assistant Examiner* — Quoc A Tran
(74) *Attorney, Agent, or Firm* — Remarck Law Group PLC (57) ABSTRACT

In one aspect, a virtual input device can be configured by detecting a language identifier associated with a selected data entry field, determining a key mapping corresponding to the detected language identifier, configuring a virtual input device in accordance with the key mapping, wherein the virtual input device includes one or more controls and the key mapping specifies a character corresponding to at least one of the plurality of controls, and presenting the virtual input device to a user. The language identifier can comprise one of an Extensible Markup Language tag and a Hypertext Markup Language tag. Further, user input selecting a second data entry field can be received, wherein a second language identifier is associated with the second data entry field, a second key mapping corresponding to the second language identifier can be determined, and the virtual input device can be configured in accordance with the second key mapping.

29 Claims, 6 Drawing Sheets

DYNAMIC VIRTUAL INPUT DEVICE CONFIGURATION

TECHNICAL FIELD

The present disclosure relates to configuring a virtual input device based on one or more identifiers associated with an electronic form or document, such as a web page, and to systems and methods for presenting the virtual input device to a user.

BACKGROUND

A virtual input device can be implemented as a resource or feature of a computer program to receive input associated with that program. A virtual input device also can be implemented as a separate computer program that is configurable to provide received input to one or more other applications running on the same computing device. The virtual input device can be presented on a display device, such as a computer monitor or a liquid crystal display (LCD) screen. Further, the virtual input device can be presented in a window associated with a computer program, such as an electronic mail application or a search engine. Alternatively, a virtual input device can be displayed through projection onto a surface, such as a desk or a wall.

One or more controls, including virtual keys, virtual buttons, and virtual switches, can be included in the virtual input device. Further, the one or more controls can be arranged to represent a physical input device, such as a keyboard, keypad, or instrument panel. A user can actuate a control included in the virtual input device by manipulating a physical input device coupled to the computing device on which the virtual input device is presented. For example, the Windows XP On-Screen Keyboard by Microsoft Corp. of Redmond, Wash. is a virtual keyboard that can be controlled using one or more physical input devices, including a mouse and a keyboard. Touch using a finger or a pointing device, such as a stylus, also can be used to actuate the one or more controls included in the virtual input device.

Actuating a control associated with a virtual input device causes an action corresponding to the control to be performed, such as entering an item of data or executing a command. The virtual input device can be configured to receive and interpret simple input indicated by actuating a single control. For example, a virtual keyboard can be configured such that actuating the "n" key associated with the virtual keyboard causes the letter "n" to be entered into a corresponding location, such as a text field. The virtual input device also can be configured to receive and interpret complex input indicated by actuating a combination of two or more controls. For example, a "shift" key associated with the virtual keyboard can be actuated before the "n" key is actuated to cause a capital letter "N" to be entered as input.

Additionally, the layout of the one or more controls included in a virtual input device can be customized based on a variety of factors, including the computing device hosting the virtual input device, the application for which the virtual input device is being used, and user preference. For example, the virtual input device can be sized in accordance with an available display area of the computer device on which it is hosted. One or more controls also can be added to or eliminated from a virtual input device. Further, the layout of a virtual input device can be customized. For example, the layout of the controls included in a virtual input device can be selected from a plurality of existing layouts, such as the QWERTY or the Dvorak layout.

SUMMARY

The present inventors recognized a need to provide an improved system and method for configuring a virtual input device and presenting a virtual input device to a user. Further, the need was recognized to use an identifier associated with a data input area of an electronic form or document to configure a virtual input device. Additionally, the present inventors recognized the need to configure a virtual input device such that one or more characteristics of the virtual input device correspond to the type of information to be input.

The present inventors also recognized the need to select the language supported by a virtual input device based on a language identifier associated with a data input area, such as a field. Further, the present inventors recognized the need to automatically reconfigure one or more controls, such as a key mapping, of a virtual input device when a data input area characterized by a data type that differs from the current data type of the virtual input device is selected. Additionally, the need was recognized to permit a user to specify one or more preferences associated with an application or an electronic form or document, such as the language associated with one or more data input areas.

In general, in one aspect, the subject matter can be implemented to include detecting a language identifier associated with a selected data entry field; determining a key mapping corresponding to the detected language identifier; configuring a virtual input device in accordance with the key mapping, wherein the virtual input device includes one or more controls and the key mapping specifies a character corresponding to at least one of the plurality of controls; and presenting the virtual input device to a user.

The subject matter also can be implemented such that the virtual input device is presented in a window that includes the selected data entry field. Further, the subject matter can be implemented such that the language identifier comprises one of an Extensible Markup Language tag and a Hypertext Markup Language tag. Additionally, the subject matter can be implemented to include associating the language identifier with the selected data entry field based on a user preference.

The subject matter also can be implemented such that configuring further comprises defining a layout of the virtual input device. Further, the subject matter can be implemented to include defining the layout of the virtual input device in accordance with a display area in which the virtual input device is presented to the user. Additionally, the subject matter can be implemented such that the key mapping includes a plurality of characters associated with an alphabet corresponding to the language identifier.

The subject matter also can be implemented to include receiving user input selecting a control included in the virtual input device and entering a character associated with the selected control in the selected data entry field. Further, the subject matter can be implemented to include receiving user input selecting a second data entry field, wherein a second language identifier is associated with the second data entry field; determining a second key mapping corresponding to the second language identifier; and configuring the virtual input device in accordance with the second key mapping.

In general, in another aspect, the subject matter can be implemented as a computer program product, encoded on a computer-readable medium, operable to cause data processing apparatus to perform operations comprising detecting a language identifier associated with a selected data entry field;

determining a key mapping corresponding to the detected language identifier; configuring a virtual input device in accordance with the key mapping, wherein the virtual input device includes one or more controls and the key mapping specifies a character corresponding to at least one of the plurality of controls; and presenting the virtual input device to a user.

Further, the subject matter can be implemented such that the language identifier comprises one of an Extensible Markup Language tag and a Hypertext Markup Language tag. The subject matter also can be implemented to be further operable to cause data processing apparatus to perform operations comprising associating the language identifier with the selected data entry field based on a user preference. Additionally, the subject matter can be implemented such that configuring further comprises defining a layout of the virtual input device.

The subject matter also can be implemented to be further operable to cause data processing apparatus to perform operations comprising defining the layout of the virtual input device in accordance with a display area in which the virtual input device is presented to the user. Further, the subject matter can be implemented such that the key mapping includes a plurality of characters associated with an alphabet corresponding to the language identifier. Additionally, the subject matter can be implemented to be further operable to cause data processing apparatus to perform operations comprising receiving user input selecting a control included in the virtual input device and entering a character associated with the selected control in the selected data entry field. The subject matter also can be implemented to be further operable to cause data processing apparatus to perform operations comprising receiving user input selecting a second data entry field, wherein a second language identifier is associated with the second data entry field; determining a second key mapping corresponding to the second language identifier; and configuring the virtual input device in accordance with the second key mapping.

In general, in another aspect, the subject matter can be implemented as a system comprising a display and processor electronics configured to perform operations comprising detecting a language identifier associated with a selected data entry field; determining a key mapping corresponding to the detected language identifier; configuring a virtual input device in accordance with the key mapping, wherein the virtual input device includes one or more controls and the key mapping specifies a character corresponding to at least one of the plurality of controls; and presenting the virtual input device on the display.

The subject matter also can be implemented such that the language identifier comprises one of an Extensible Markup Language tag and a Hypertext Markup Language tag. Additionally, the subject matter can be implemented to include a user input device; wherein the processor electronics are further configured to perform operations comprising receiving input through the user input device selecting a second data entry field, wherein a second language identifier is associated with the second data entry field; determining a second key mapping corresponding to the second language identifier; and configuring the virtual input device in accordance with the second key mapping.

The techniques described in this document can be implemented to realize one or more of the following advantages. For example, the techniques can be implemented to detect a data type associated with an input field based on an item of meta data, such as a tag in a markup language document. Further, the techniques can be implemented to automatically reconfigure a virtual input device such that one or more included controls correspond to a data type of a currently selected data input field. Additionally, the techniques can be implemented such that a data type corresponds to an alphabet or character set associated with a language. The techniques also can be implemented to permit a user to specify one or more preferences associated with a virtual input device, including language preferences corresponding. Further, the techniques can be implemented to permit a user to specify one or more preferences associated with a data input area of an application, such as an individual data entry field. Additionally, the techniques can be implemented to permit determining a layout of a virtual input device based on an item of meta data, such as a tag or value included in a markup language document.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
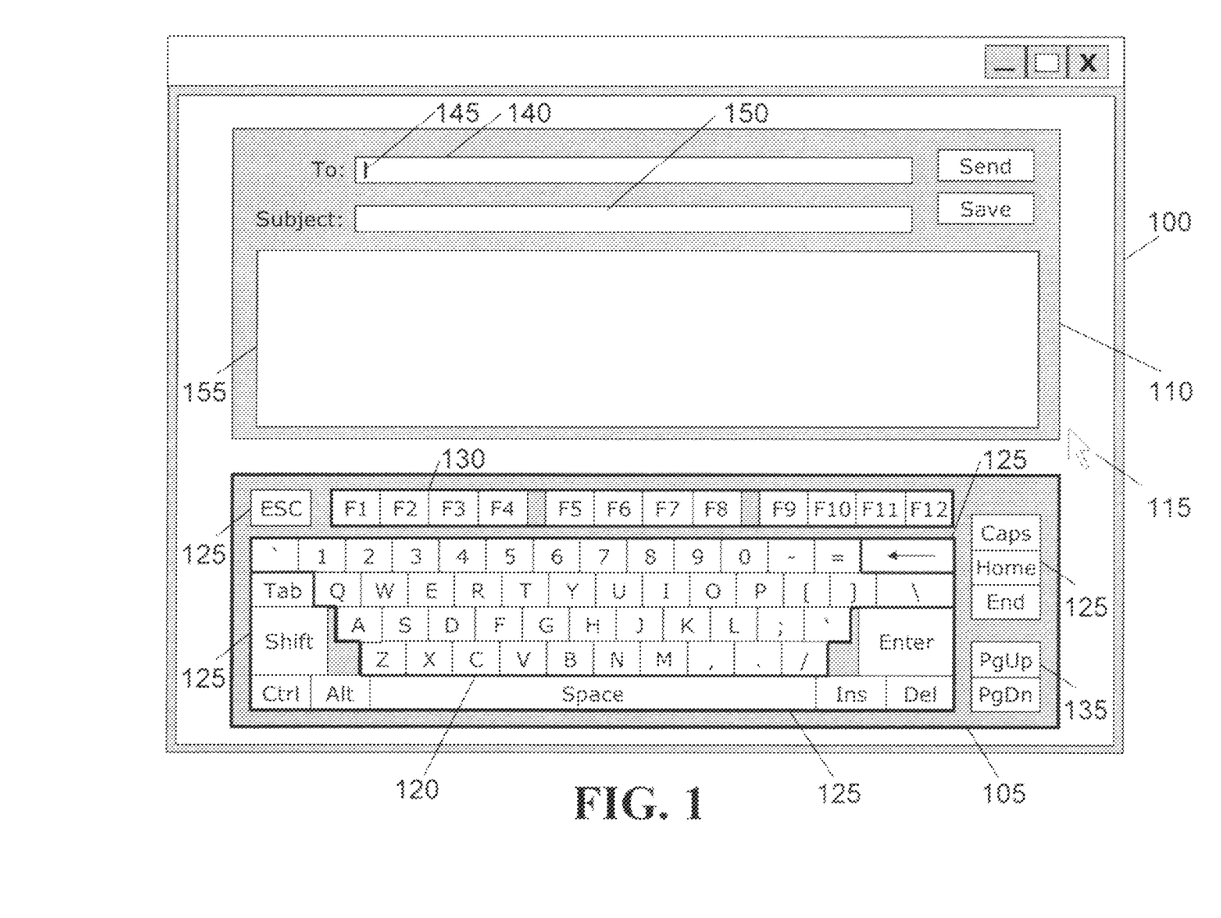
FIGS. 1 and 2 show a display that includes a virtual input device.

FIG. 1 shows a display 100 that includes a virtual input device 105. The display 100 including the virtual input device 105 can be implemented using a wide variety of computing devices, including personal computers, servers, laptop computers, palm-top computers, personal digital assistants, smart phones, and special purpose computers, such as automated teller machines and payment terminals.

The display 100 can be implemented as a window or other screen generated by an application executed on a computing device. Further, the application can be a stand-alone application or a shared application that can pass an item of data received through the virtual input device 105 to one or more separate applications. For example, the display 100 can be presented as a window corresponding to an application, such as a web browser or a word processor program. Further, the display 100 can be shown on a display device coupled to or otherwise associated with the computing device on which the application generating the display 100 is hosted. The display device can be any device capable of presenting a visual image generated by an application, including a monitor and an LCD screen.

The display 100 also can include a data entry template 110. Further, one or more scroll bars can be associated with the display 100 if an item or object included in the display 100 extends beyond the display boundaries in any direction. The scroll bars can be utilized to selectively view a portion of the display 100. Further, the display 100 can be resized to provide a larger viewable area, such as through one or more user controls or configuration settings.

The size and shape of the virtual input device 105 can be determined based on a variety of factors, including the computing device hosting the virtual input device 105, the function for which the virtual input device 105 is being used, and one or more preference settings. For example, one or more dimensions of the virtual input device 105 can be modified to conform to a device having a reduced display area, such as a smart phone or personal digital assistant. Additionally, a layout of the virtual input device 105 also can be modified in accordance with the display area. For example, the arrangement of the virtual input device 105 with respect to a data entry field, text, image, or other object can vary based on the available display area. The arrangement of one or more controls included in the virtual input device 105 also can vary based on the available display area.

The virtual input device 105 includes one or more controls that permit a user to enter input, such as data or commands. For example, the virtual input device 105 can be configured to include one or more character keys 120. A character key 120 can be associated with one or more letters, numbers, or symbols. Further, the one or more character keys 120 included in the virtual input device 105 can represent an alphabet, a character set, or a writing system. Thus, the one or more character keys 120 can be used to represent the characters of a language, such as a language based on the Latin alphabet, the Cyrillic alphabet, the Arabic alphabet, Chinese characters, Korean characters, or a Japanese writing system.

Further, the virtual input device 105 can include one or more command keys 125, which correspond to an action that can be performed by an application associated with the virtual input device, such as an application that receives input from the virtual input device 105. A command key 125 can be mapped either to an application specific action or a global action that is commonly supported by a plurality of applications. For example, a command key 125 can be mapped to the global action of entering a space. Thus, actuating a command key 125 mapped to the "space" action will cause a blank space to be entered as input.

An action also can be initiated by actuating a combination of keys, such as a command key 125 and a character key 120. For example, in an application, the command key 125 mapped to the "ctrl" action and the character key 120 mapped to the letter "c" can be actuated simultaneously or sequentially to enter the command crtl-c, which can be used to instruct an application to copy a selected item. The combination of ctrl-c can be mapped to the same or a different action in another application. Further, a character key 120 can be associated with a plurality of characters, such as a primary character and a secondary character. If the character key 120 is actuated individually, the input can correspond to the primary character. Alternatively, actuating the character key 120 in combination with a control, such as a command key 125, can cause the input to correspond to the secondary character.

Further, the virtual input device 105 can include one or more function keys 130, which can be mapped to one or more functions defined by an application. For example, an application receiving input from the virtual input device 105 can be configured to interpret actuation of the "F1" function key 130 as a request for help. Additionally, the virtual input device 105 can include one or more navigation keys 135, which can receive input indicating desired movement within a screen of information. For example, in response to input corresponding to the navigation key 135 mapped to the "PgUp" action, an application can present information that logically precedes the information currently displayed, such as a previous section of a document.

The display 100 also can include a cursor 115 that can be used to select one or more controls included in the virtual input device 105. The cursor 115 can be positioned over a control included in the virtual input device 105 by manipulating a physical control device associated with the computing device generating the display 100, such as a mouse, a touch pad, a joystick, or a trackball. Further, the control included in the virtual input device 105 over which the cursor 115 is positioned can be actuated through an input associated with the physical control device, such as a button click or a tap.

In an implementation, an active control included in the virtual input device 105 can be distinguished from all of the remaining controls, such as by outline or shading. An input to a physical control device, such as a button click or depressing an "enter" key, can be used to actuate the active control. Further, the active control can be changed without actuating the control by an input to one or more other controls associated with the physical control device, such as a directional control. For example, one or more arrow keys or buttons associated with the physical control device can be actuated to cause a different control included in the virtual input device 105 to be designated as the active control. In another implementation, the display 100 can be presented on a touch screen display and one or more controls included in the virtual control device 105 can be actuated by contacting the touch screen display in an area corresponding to the one or more controls.

The data entry template 110 is generated by the application that generates the display 100. In another implementation, the data entry template 110 can be generated by a separate application. Further, the data entry template can be defined by one or more source files, including mark-up language files, text files, or any other files that are compatible with the application that generates the display. Additionally, the one or more source files can define any combination of static and dynamic content. Thus, one or more portions of the data entry template 110 can be defined based on conditions existing at the time the data entry template 110 is generated, including user preferences or specifications. The data entry template 110 also can include one or more data entry fields that can be configured to receive input. A data entry field can be a generic field configured to receive a plurality of data types or can correspond to a particular type of data.

In an exemplary implementation, the data entry template 110 can be configured as an electronic mail message template. However, a data entry template can be configured for use with a wide variety of applications. The data entry template 110 of the present example can include a recipient data field 140 that is configured to receive one or more e-mail addresses corresponding to intended recipients. In an implementation, separate data entry fields can be included for different groups of recipients, such as primary recipients, courtesy copy recipients, and blind courtesy copy recipients. The data entry template 110 also can include a subject data field 150 and a text data field 155. Further, a data entry cursor 145 can be displayed to indicate the presently selected data field. For example, input entered into the data entry template 110, such as through the virtual input device 105, will be displayed in the recipient data field 140 when the data entry cursor 145 is displayed in the recipient data field 140. In another implementation, the presently selected data field can be indicated through other means, such as by highlighting or shading.

Further, one or more language identifiers can be associated with the data entry template 110. For example, a language identifier can be associated with a particular data entry field to identify a language corresponding to that data entry field. Further, a default language identifier can be associated with the data entry template 110 to identify the default language for all of the included data entry fields, such as any data entry field for which a corresponding language identifier has not otherwise been specified. The one or more language identifiers can be set based on rules, application requirements, user preferences, or any combination thereof.

In an implementation, a language identifier can be implemented as a tag, such as an HTML or XML tag, that specifies a language attribute. Alternatively, a language identifier can be specified in metadata associated with one or more instructions used to generate the data entry template 110. The language identifier associated with a presently selected data field can be determined by an application generating the display 100, such as when the data field is selected. Further, the virtual input device 105 can be configured to include one or more character keys 120 that correspond to the language identifier. For example, if the language identifier associated with the recipient data field 140 (e.g., the presently selected data field) is "en" or English, the one or more character keys 120 can correspond to the English language.

In another implementation, the data entry template 110 can include one or more data type identifiers that indicate a particular type of data to be received in a data field. Further, the virtual input device 105 can be configured to present controls corresponding to the identified data type.

Figure 2:
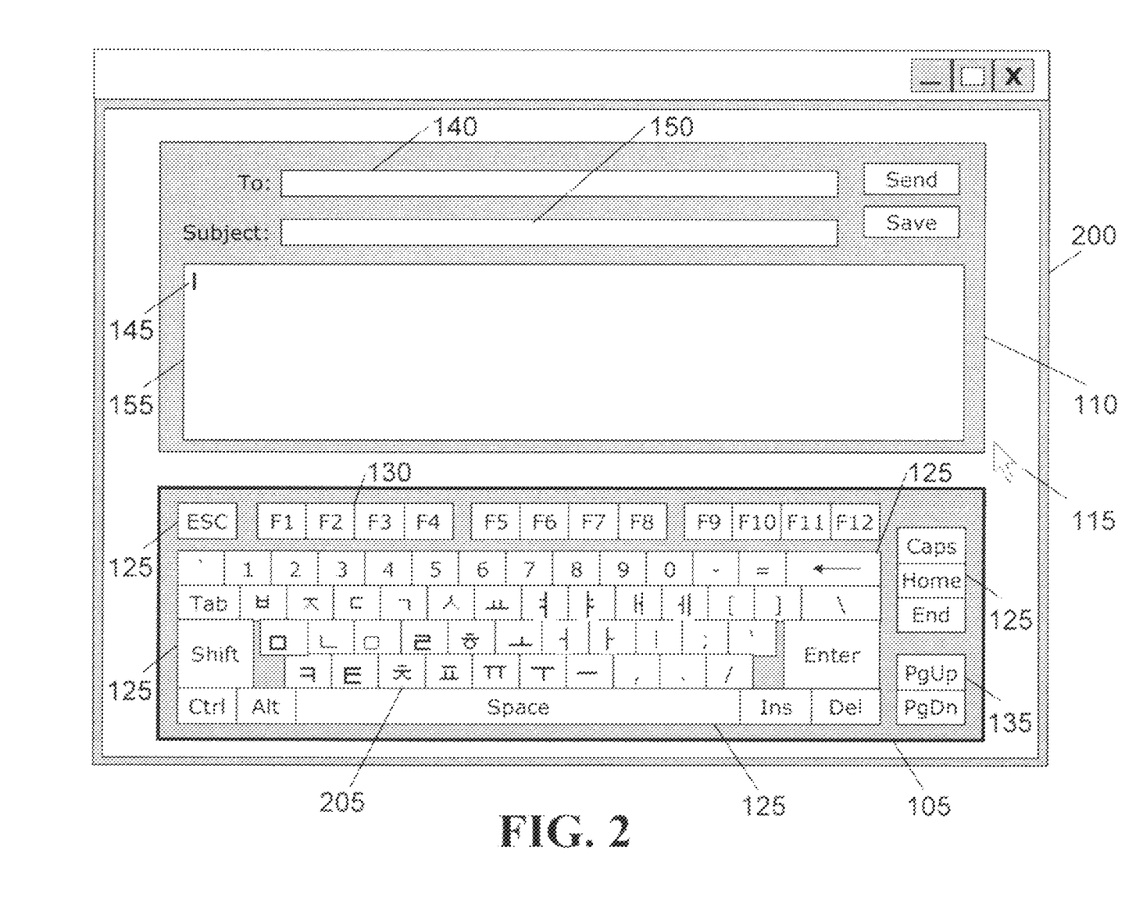

FIG. 2 shows a display 200 that includes a virtual input device 105. In the display 200, the data entry cursor 145 is displayed in the text data field 155, indicating that the text data field 155 is the presently selected data field. In the present example, the language identifier (not displayed) associated with the text data field 155 corresponds to "zh" or Chinese. For example, the language identifier can be a tag associated with the text data field 155 included in a file or instructions defining the data entry template 110. Therefore, the virtual input device 105 is configured to include one or more character keys 205 that correspond to a Chinese character set. Further, with the exception of the one or more character keys 205, the layout of the virtual input device 105 can be the same for a plurality of languages. Alternatively, the layout of the virtual input device 105 can be reconfigured when the one or more character keys included in the virtual input device 105 are mapped to a different language, character set, or writing system.

Figure 3:
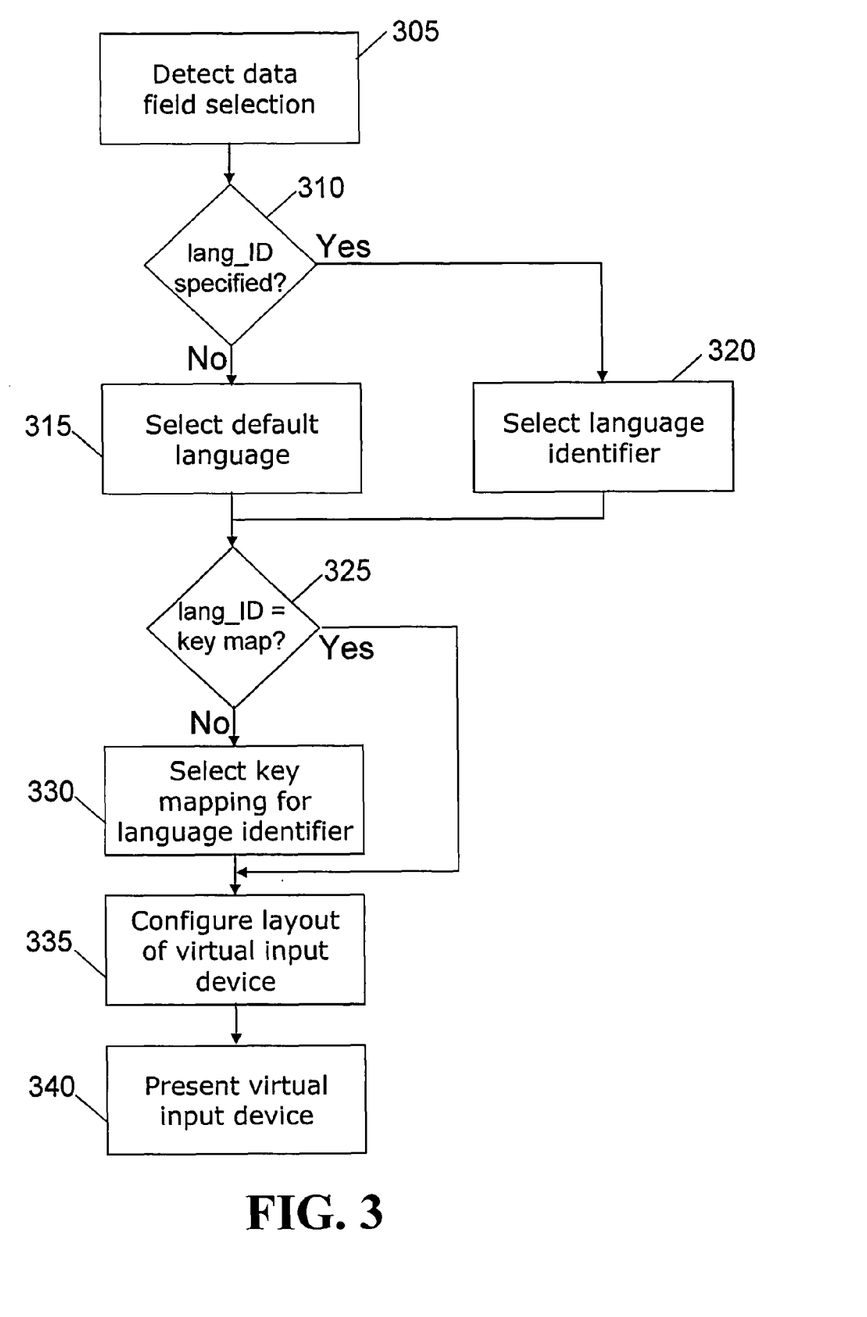
FIG. 3 shows a flowchart for configuring a virtual input device.

FIG. 3 shows a flowchart for configuring a virtual input device. A selection of a data field can be detected by the application that generates the virtual input device (305). For example, the data field can be selected by a user positioning a pointing device proximal to the data field and actuating a control, such as a button. The data field also can be selected by a user contacting a touch screen proximal to the data field. The data field further can be selected by a user toggling through one or more data fields, such as by actuating a physical control that causes the application to iteratively select a data field. When a data field is selected, such as a data field of a data entry template, the application determines whether a language identifier (or "ID") has been specified for the data field (310).

If a language identifier has not been specified for the selected data field, a default language associated with the application or data entry template is selected (315). The default language can be established at any time. For example, the default language can be set and persistently stored when the application is installed. Alternatively, the default language can be established when the application is executed, such as by a accessing one or more locality settings associated with a host computer system, such as a system time zone, a system language, and a network address.

If a language identifier has been specified, the language corresponding to the language identifier is selected (320). A language identifier associated with a data field also can be established at any time. For example, a user can associate a particular language identifier with one or more data fields, such as during the installation or execution of an application. Alternatively, a language identifier associated with a data field can be determined dynamically based on one or more user profile settings. For example, a user can specify a preference to enter data in Korean whenever possible for one or more applications. Thus, a language identifier associated with a data field can be set to Korean when that data field is invoked, such as when the data field or the template in which the data field is included is generated, displayed, or accessed.

Once the language identifier associated with the data field has been determined, the language identifier can be compared with the language corresponding to the key mapping of the virtual input device (325). The key mapping of the virtual input device can include a plurality of character keys that are mapped to letters, characters, and/or symbols associated with a language. Further, the key mapping can correspond to a particular layout of character keys for a particular language.

If the language identifier and the language corresponding to the key mapping differ, a key mapping corresponding to the language identifier can be selected (330). For example, a plurality of data sets can be defined, wherein each data set maps a character set associated with a language to the one or more character keys included in the virtual input device. Further, a plurality of data sets can correspond to the same language. For example, "zh-Hans" can be used to identify a character set corresponding to simplified Chinese script and "zh-Hant" can be used to identify a character set corresponding to traditional Chinese script. Additionally, a plurality of layouts, each represented by a separate data set, can be associated with a single language, character set, or writing system. For example, a first data set can be used to represent a key mapping corresponding to English QWERTY and a second data set can be used to represent a key mapping corresponding to English Dvorak. Thus, different language identifiers can be used to represent different key mappings associated with the same language. If the language identifier and the language of the current key mapping correspond, the current key mapping is retained.

The layout of the virtual input device also is configured (335). The layout of the virtual input device can be determined based on one or more factors, including the size of the display area allocated to the virtual input device, the number and size of the keys included in the virtual input device, one or more user preference settings, and the native layout of an associated physical keyboard, such as QWERTY (English), QWERTZ (German), or AZERTY (French). In an implementation, the layout of the virtual input device also can be altered while the virtual input device is displayed, such as through a drag-and-drop interface or user configurable boundaries.

Once configured, the virtual input device can be presented (340). For example, the virtual input device can be presented in the display, such as in an application window. Further, when the configuration of the virtual input device changes, one or more other items included in the display can be persistently presented. Thus, the virtual input device can be displayed with a new key mapping without altering or interrupting the presentation of one or more other items included in the display.

Figure 4:
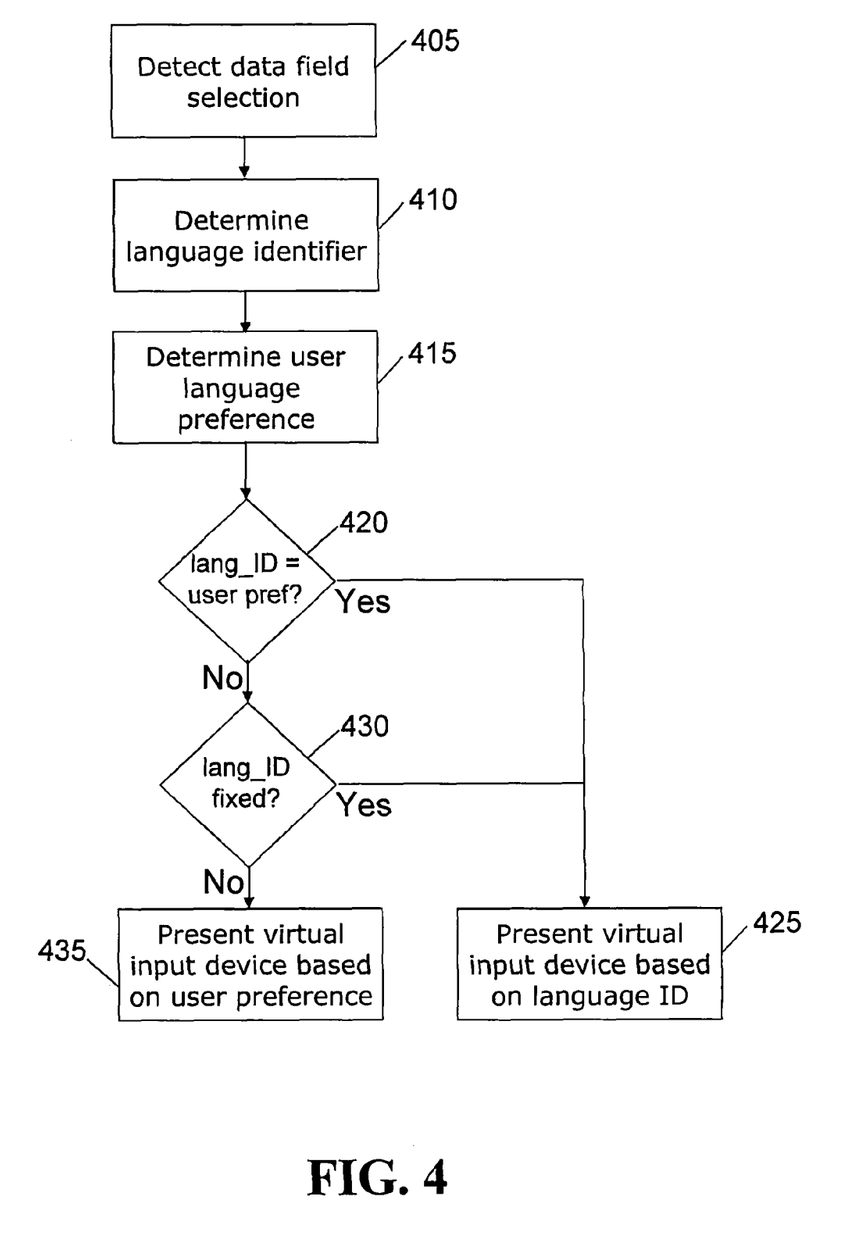
FIG. 4 shows a flowchart for determining a locale to apply for a virtual input device.

FIG. 4 shows a flowchart for determining a locale to apply for a virtual input device. A data field selection can be detected by the application that generates the virtual input device (405). As discussed above, the data field can be selected by a user positioning a pointing device proximal to the data field and actuating a control, such as a button. The data field also can be selected by a user contacting a touch screen proximal to the data field or by a user toggling through a plurality of data fields, such as by actuating a physical control that causes the application to iteratively select a data field.

A language identifier associated with the selected data field can be determined (410). For example, a tag, such as an HTML tag or XML tag, or other identifier corresponding to the selected data field can be read. The tag or other identifier can indicate a language associated with the data field. Further, a user language preference can be determined based on one or more factors (415). The user language preference can be general or specific. For example, the user language preference can be associated with a plurality of applications, a single application, one or more data entry templates, or a particular data entry field. In an implementation, a user profile can be accessed to determine whether the user has established a language preference. The user profile can indicate one or more user language preferences and/or data type preferences. For example, a user profile can indicate that the corresponding user has a language preference of Chinese for use with an electronic mail application. In another implementation, the user language preference can be stored in a cookie. For example, a cookie indicating a selected language preference can be stored on the user's computer and accessed when the user interacts with a particular object, such as a form or page.

The language identifier associated with the selected data field is compared with the determined user language preference (420). If the language identifier and the user language preference match, the virtual input device is presented in accordance with the language identifier (425). For example, if the language identifier associated with the selected data field and the user language preference both indicate Chinese, the virtual input device can be presented with a key mapping that corresponds to a data set of Chinese characters.

If the language identifier and the user language preference do not match, the language identifier is checked to determine whether it is fixed (430). If the language identifier associated with the selected data field is fixed, the language associated with the selected data field cannot be changed. For example, an electronic mail message may be improperly routed if the recipient address cannot be correctly interpreted. A message addressed using a Chinese character set or text containing a ligature or accent can be misinterpreted or rejected. Thus, an address data field associated with an electronic mail application can have a fixed language identifier that is set to a supported language or character set, such as English. If the language identifier is fixed, the virtual input device is presented in accordance with the language identifier (425). Thus, the user language preference is not invoked to change the key mapping of the virtual input device. However, if the language identifier is not fixed, the virtual input device is presented in accordance with the user language preference (425). Thus, the user can enter data into the selected data field in the preferred language.

Further, the key mapping of the virtual input device will be automatically configured in accordance with both the requirements of the application and the established user preferences as the presently selected data field changes. For example, if a recipient address data field is presently selected, the virtual input device can be displayed with a key mapping corresponding to the English language. Upon changing the presently selected data field to a message text field, however, the key mapping of the virtual input device can be automatically changed to reflect the user's specified language preference, such as Chinese.

Figure 5:
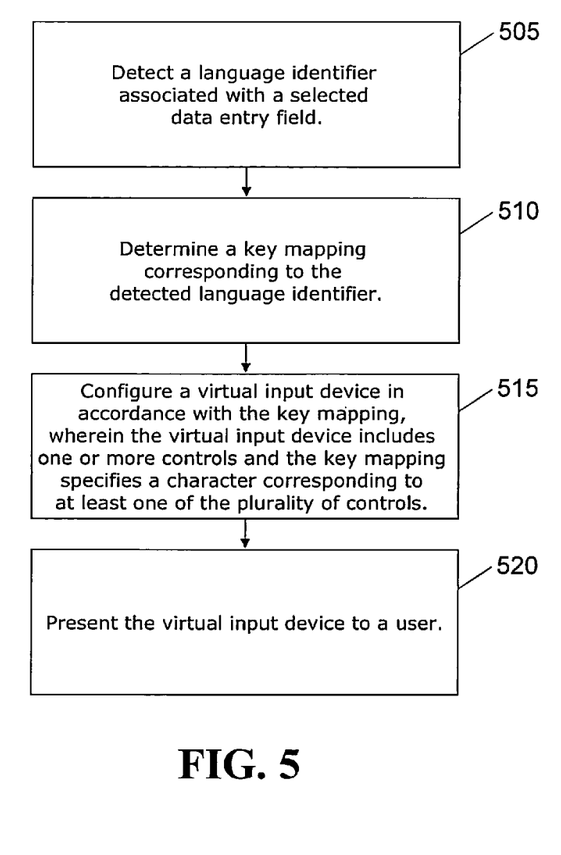
FIG. 5 shows a flowchart for configuring a virtual input device.

FIG. 5 shows a flowchart for configuring a virtual input device. Initially, a language identifier associated with a selected data entry field is detected (505). A key mapping corresponding to the detected language identifier is determined (510). A virtual input device is configured in accordance with the key mapping, wherein the virtual input device includes one or more controls and the key mapping specifies a character corresponding to at least one of the plurality of controls (515). Once configured, the virtual input device is presented to a user (520).

Figure 6:
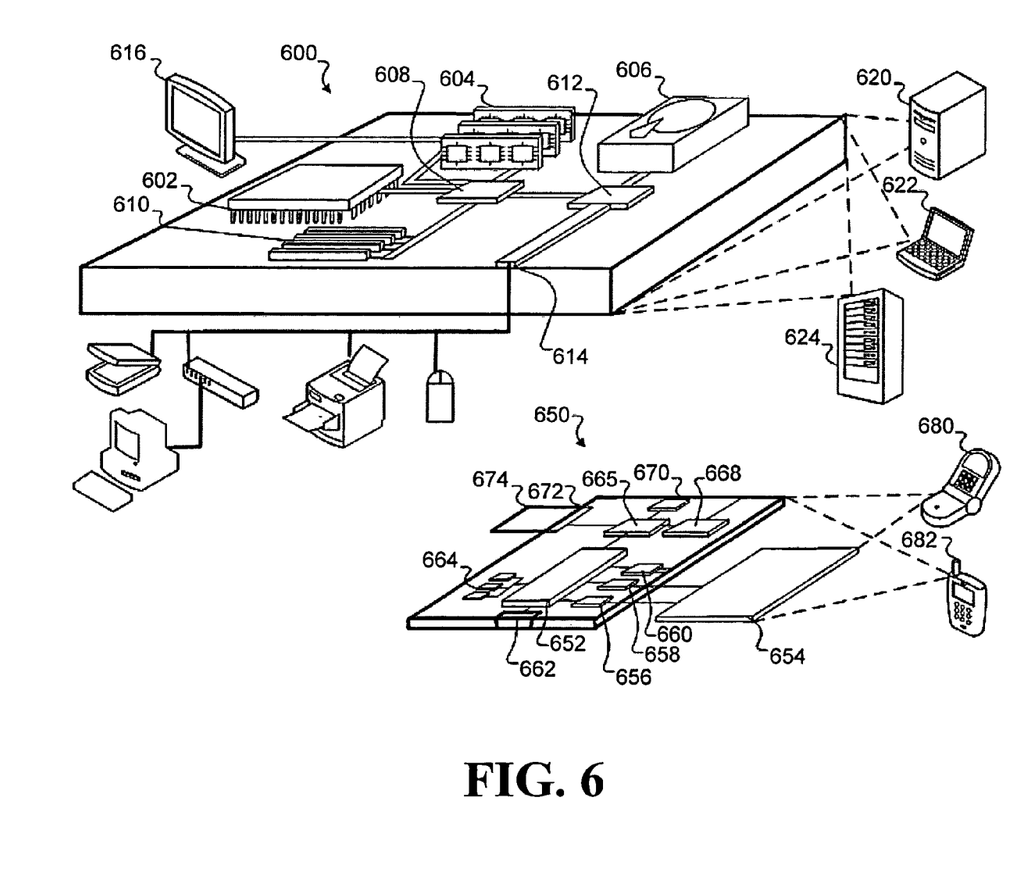
FIG. 6 shows a block diagram of computing devices and systems

FIG. 6 is a block diagram of computing devices and systems 600, 650. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 coupling the memory 604 and high-speed expansion ports 610, and a low speed interface 612 coupled to a low speed bus 614 and the storage device 606. Each of the components 602, 604, 606, 608, 610, and 612, are interconnected using various busses, and may be mounted on a common motherboard or in other manners, as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is one or more volatile memory units. In another implementation, the memory 604 is one or more non-volatile memory units.

The storage device 606 is capable of providing mass storage for the computing device 600. In one implementation, the storage device 606 includes a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. Information carriers suitable for embodying computer programs include, for example, the memory 604, the storage device 606, a memory on the processor 602, or a propagated signal.

The high speed controller 608 manages bandwidth-intensive operations for the computing device 600, while the low speed controller 612 manages lower bandwidth-intensive operations. Such an allocation of duties is, however, only exemplary. In one implementation, the high-speed controller 608 is coupled to the memory 604, the display 616 (e.g., through a graphics processor or accelerator), and to the high-speed expansion ports 610, which may accept various expansion cards (not shown). In the implementation, the low-speed controller 612 is coupled to the storage device 606 and the low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Device 650 includes a processor 652, a memory 664, an input/output device such as a display 654, a communication interface 665, and a transceiver 668, among other components. The device 650 may also be provided with a storage device, such as a microdrive or other device, to provide additional storage. Each of the components 650, 652, 664, 654, 665, and 668, are interconnected using various buses, and two or more of the components can be mounted on a common motherboard or in other manners, as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

The processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the device 650. In one implementation, the memory 664 is a computer-readable medium. In one implementation, the memory 664 is one or more volatile memory units. In another implementation, the memory 664 is one or more non-volatile memory units. Expansion memory 674 may also be provided and connected to the device 650 through expansion interface 672, which may include, for example, a SIMM card interface. Such expansion memory 674 may provide extra storage space for device 650, or may also store applications or other information for the device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. Information carriers suitable for embodying computer programs include, for example, the memory 664, expansion memory 674, memory on processor 652, or a propagated signal.

The device 650 may communicate wirelessly through communication interface 665, which may include digital signal processing circuitry where necessary. Communication interface 665 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the described embodiments. Accordingly, other embodiments are within the scope of the following claims.

What is claimed is:

1. A computer implemented method comprising:
receiving a document that is based on a markup language, the document including language identifiers that are arranged based on the markup language;
presenting a plurality of data entry fields based on the document, the data entry fields being associated with the language identifiers, respectively;
receiving user input selecting a data entry field from among the plurality of data entry fields;
detecting a language identifier associated with the selected data entry field, wherein detecting the language identifier comprises accessing a tag included in the document, the language identifier identifying a language associated with the selected data entry field;
determining a key mapping corresponding to the language identified by the detected language identifier;
configuring a virtual input device in accordance with the key mapping, wherein the virtual input device includes one or more controls, and wherein the key mapping specifies a character corresponding to at least one of the one or more controls; and
presenting the virtual input device to a user.

2. The method of claim 1, wherein the virtual input device is presented in a window that includes the selected data entry field.

3. The method of claim 1, wherein the language identifier comprises the tag, wherein the markup language comprises one of an Extensible Markup Language or a Hypertext Markup Language.

4. The method of claim 1, further comprising:
associating the language identifier with the selected data entry field based on a user preference.

5. The method of claim 1, wherein configuring further comprises defining a layout of the virtual input device.

6. The method of claim 5, further comprising:
defining the layout of the virtual input device in accordance with a display area in which the virtual input device is presented to the user.

7. The method of claim 1, wherein the key mapping includes a plurality of characters associated with an alphabet corresponding to the language identifier.

8. The method of claim 7, further comprising:
receiving user input selecting a control included in the virtual input device; and
entering a character associated with the selected control in the selected data entry field.

9. The method of claim 1, further comprising:
receiving user input selecting a second data entry field of the data entry fields, wherein a second language identifier is associated with the second data entry field, the second language identifier identifying a second language associated with the selected second data entry field;
determining a second key mapping corresponding to the second language identified by the second language identifier; and
configuring the virtual input device in accordance with the second key mapping.

10. A non-transitory computer storage device encoded with a computer program, the program comprising instructions that when executed by data processing apparatus cause the data processing apparatus to perform operations comprising:

receiving a document that is based on a markup language, the document including language identifiers that are arranged based on the markup language;

presenting a plurality of data entry fields based on the document, the data entry fields being associated with the language identifiers, respectively;

receiving user input selecting a data entry field from among the plurality of data entry fields;

detecting a language identifier associated with the selected data entry field, wherein detecting the language identifier comprises accessing a tag included in the document, the language identifier identifying a language associated with the selected data entry field;

determining a key mapping corresponding to the language identified by the detected language identifier;

configuring a virtual input device in accordance with the key mapping, wherein the virtual input device includes one or more controls, and wherein the key mapping specifies a character corresponding to at least one of the one or more controls; and presenting the virtual input device to a user.

11. The device of claim 10, wherein the virtual input device is presented in a window that includes the selected data entry field.

12. The device of claim 10, wherein the language identifier comprises the tag, wherein the markup language comprises one of an Extensible Markup Language or a Hypertext Markup Language.

13. The device of claim 10, further operable to cause data processing apparatus to perform operations comprising:

associating the language identifier with the selected data entry field based on a user preference.

14. The device of claim 10, wherein configuring further comprises defining a layout of the virtual input device.

15. The device of claim 14, further operable to cause data processing apparatus to perform operations comprising:

defining the layout of the virtual input device in accordance with a display area in which the virtual input device is presented to the user.

16. The device of claim 10, wherein the key mapping includes a plurality of characters associated with an alphabet corresponding to the language identifier.

17. The device of claim 16, further operable to cause data processing apparatus to perform operations comprising:

receiving user input selecting a control included in the virtual input device; and entering a character associated with the selected control in the selected data entry field.

18. The device of claim 10, further operable to cause data processing apparatus to perform operations comprising:

receiving user input selecting a second data entry field of the data entry fields, wherein a second language identifier is associated with the second data entry field, the second language identifier identifying a second language associated with the selected second data entry field;

determining a second key mapping corresponding to the second language identified by the second language identifier; and configuring the virtual input device in accordance with the second key mapping.

19. A system comprising:

a display; and processor electronics configured to perform operations comprising:

receiving a document that is based on a markup language, the document including language identifiers that are arranged based on the markup language;

presenting a plurality of data entry fields based on the document, the data entry fields being associated with the language identifiers, respectively;

receiving user input selecting a data entry field from among the plurality of data entry fields;

detecting a language identifier associated with the selected data entry field, wherein detecting the language identifier comprises accessing a tag included in the document, the language identifier identifying a language associated with the selected data entry field;

determining a key mapping corresponding to the language identified by the detected language identifier;

configuring a virtual input device in accordance with the key mapping, wherein the virtual input device includes one or more controls, and wherein the key mapping specifies a character corresponding to at least one of the one or more controls; and presenting the virtual input device on the display.

20. The system of claim 19, wherein the language identifier comprises the tag, wherein the markup language comprises one of an Extensible Markup Language or a Hypertext Markup Language.

21. The system of claim 19, further comprising:

a user input device; and wherein the processor electronics are further configured to perform operations comprising:

receiving input through the user input device selecting a second data entry field of the data entry fields, wherein a second language identifier is associated with the second data entry field, the second language identifier identifying a second language associated with the selected second data entry field;

determining a second key mapping corresponding to the second language identified by the second language identifier; and configuring the virtual input device in accordance with the second key mapping.

22. A method performed by one or more processes executing on a computer system, the method comprising:

presenting a plurality of data entry fields based on a received file, the received file being based on a markup language, the data entry fields being associated with respective data type identifiers included in the received file, the data type identifiers including respective tags that are based on the markup language and identifying a type of data associated with its corresponding data entry field;

receiving user input selecting a data entry field from among the presented plurality of data entry fields;

determining a configuration mapping corresponding to the type of data identified by the selected data entry field's data type identifier;

reconfiguring a dynamically configurable input device in accordance with the determined configuration mapping, wherein the dynamically configurable input device includes one or more configurable controls, and wherein the key mapping specifies a character corresponding to at least one of the one or more configurable controls;

presenting the reconfigured dynamically configurable input device to a user; and receiving input in the selected data entry field from the user via the reconfigured dynamically configurable input device.

23. The method of claim 22 in which the dynamically configurable input device comprises a virtual keyboard.

24. The method of claim 23 in which the configurable controls comprise configurable keys on the virtual keyboard.

25. The method of claim 22 in which the plurality of data entry fields comprise fields in an electronic document.

26. The method of claim 22 in which the plurality of data entry fields comprise fields in a web form.

27. The method of claim 22 in which re-configuring the dynamically configurable input device in accordance with the determined configuration mapping comprises changing the dynamically configurable input device to accommodate an input type specific to the selected data entry field.

28. The method of claim 22, wherein the markup language comprises an Extensible Markup Language.

29. The method of claim 22, wherein the markup language comprises a Hypertext Markup Language.

* * * * *